(12) United States Patent
Sourour et al.

(10) Patent No.: US 6,421,371 B1
(45) Date of Patent: Jul. 16, 2002

(54) MODULATION SEQUENCE SYNCHRONIZATION METHODS AND APPARATUS EMPLOYING PARTIAL SEQUENCE CORRELATION

(75) Inventors: Essam Sourour, Raleigh; Gregory E. Bottomley, Cary; R. David Koilpillai, Apex, all of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/193,583

(22) Filed: Nov. 17, 1998

(51) Int. Cl.$^7$ .............................................. H04L 27/30
(52) U.S. Cl. ....................... 375/142; 375/145; 375/149; 375/150; 375/343; 375/364; 375/367; 370/515
(58) Field of Search ................................ 375/142, 145, 375/149, 150, 343, 354, 364, 367, 324, 340; 370/512, 514, 515

(56) References Cited

U.S. PATENT DOCUMENTS

| | | | |
|---|---|---|---|
| 4,291,409 A | 9/1981 | Weinberg et al. ............... | 375/1 |
| 4,418,393 A | 11/1983 | Zscheile, Jr. ................. | 364/724 |
| 4,538,281 A | 8/1985 | Rajan ......................... | 375/2.2 |
| 5,048,053 A | 9/1991 | Mower et al. .................. | 375/1 |
| 5,090,028 A * | 2/1992 | Crebouw ...................... | 375/106 |
| 5,111,478 A | 5/1992 | McDonald ...................... | 375/1 |
| 5,128,957 A | 7/1992 | Nakagawa ...................... | 375/1 |
| 5,214,669 A | 5/1993 | Zarembowitch ................. | 375/1 |
| 5,253,268 A | 10/1993 | Omura et al. .................. | 375/1 |
| 5,365,550 A | 11/1994 | Roberson ...................... | 375/1 |
| 5,574,754 A | 11/1996 | Kurihara et al. ............ | 375/367 |
| 5,579,338 A | 11/1996 | Kojima ....................... | 375/208 |
| 5,642,377 A | 6/1997 | Chung et al. ................ | 375/200 |
| 5,644,591 A | 7/1997 | Sutton ........................ | 375/200 |

(List continued on next page.)

OTHER PUBLICATIONS

Jovanovic et al., "Analysis of Non–Coherent Correlation in DS/BPSK Spread Spectrum Acquisition," IEEE Transactions on Communictions, vol. 13, No. 2/3/4, Feb./Mar./Arp. 1995.

International Search Report, PCT/US99/23941, Feb. 8, 2000.

Ibrahim et al., "Direct Sequence Spread Spectrum Matched Filter Acquisition in Frequency–Selective Rayleigh Fading Channels," IEEE Journal on Selected Areas in Communications, vol. 12, No. 5, Jun. 1994, pp. 885–890.

Baier et al., "Design Study for a CDMA–Based Third–Generation Mobile Radio System," IEEE Journal on Selected Areas in Communications, vol. 12, No. 4, May 1994, pp. 733–743.

*Primary Examiner*—Stephen Chin
*Assistant Examiner*—Dac V. Ha
(74) *Attorney, Agent, or Firm*—Myers Bigel Sibley & Sajovec

(57) ABSTRACT

A receiver in a communications system is operated by receiving a radio communications signal transmitted by a station of the communications system and generating a correlation output representing a correlation of the received radio communications signal and a subsequence of a modulation sequence that is selected based on a correlation between the selected subsequence and the modulation sequence. The receiver is then synchronized based on the generated correlation output. The selected subsequence preferably has an optimal out-of-phase correlation with the modulation sequence. According to an aspect of the present invention, the selected subsequence has a minimum out of phase correlation with the modulation sequence in comparison to other subsequences of the modulation sequence. For example, the selected subsequence may have a "minimum maximum" out-of-phase correlation value, a "minimum aggregate" out-of-phase correlation metric, or a combination thereof.

46 Claims, 7 Drawing Sheets

U.S. PATENT DOCUMENTS

| | | | |
|---|---|---|---|
| 5,654,991 A | 8/1997 | Andren et al. | 375/355 |
| 5,696,762 A | 12/1997 | Natali et al. | 370/320 |
| 5,712,869 A | 1/1998 | Lee et al. | 375/206 |
| 5,717,713 A | 2/1998 | Natali | 375/200 |
| 5,727,018 A | 3/1998 | Wolf et al. | 375/210 |
| 5,757,870 A | 5/1998 | Miya et al. | 375/367 |
| 5,768,306 A | 6/1998 | Sawahashi et al. | 375/206 |
| 5,781,543 A * | 7/1998 | Ault et al. | 370/342 |
| 5,781,584 A | 7/1998 | Zhou et al. | 375/207 |
| 5,805,648 A | 9/1998 | Sutton | 375/367 |
| 6,097,770 A * | 8/2000 | Bahai et al. | 375/343 |
| 6,163,548 A * | 12/2000 | Rainish et al. | 370/335 |
| 6,215,798 B1 * | 4/2001 | Carneheim et al. | 370/515 |
| 6,377,615 B1 * | 4/2002 | Sourour et al. | 375/142 |

* cited by examiner

MODULATION SEQUENCE SYNCHRONIZATION METHODS AND APPARATUS EMPLOYING PARTIAL SEQUENCE CORRELATION

Field of the Invention

The present invention relates to communications systems and methods, and more particularly, to apparatus and methods for synchronization with modulated signals.

BACKGROUND OF THE INVENTION

Wireless communications systems are commonly employed to provide voice and data communications to subscribers. For example, analog cellular radiotelephone systems, such as those designated AMPS, ETACS, NMT-450, and NMT-900, have been long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook,* edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Traditional analog cellular systems generally employ a system referred to as frequency division multiple access (FDMA) to create communications channels. As a practical matter well known to those skilled in the art, radiotelephone communications signals, being modulated waveforms, typically are communicated over predetermined frequency bands in a spectrum of carrier frequencies. In a typical FDMA system, each of these discrete frequency bands serves as a channel over which cellular radiotelephones communicate with a cell, through the base station or satellite serving the cell.

The limitations on the available frequency spectrum present several challenges as the number of subscribers increases. Increasing the number of subscribers in a cellular radiotelephone system requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of channels available in the cell.

For these reasons, conventional cellular systems employ frequency reuse to increase potential channel capacity in each cell and increase spectral efficiency. Frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system having only several hundred allocated frequency bands.

Another technique which can further increase channel capacity and spectral efficiency is the use of time division multiple access (TDMA). A TDMA system may be implemented by subdividing the frequency bands employed in conventional FDMA systems into sequential time slots. Communications over a frequency band typically occur on a repetitive TDMA frame structure that includes a plurality of time slots. Examples of systems employing TDMA are those conforming to the dual analog/digital IS-54B standard employed in the United States, in which each of the frequency bands of the traditional analog cellular spectrum are subdivided into 3 time slots, and systems conforming to the GSM standard, which divides each of a plurality of frequency bands into 8 time slots. In these TDMA systems, each user communicates with the base station using bursts of digital data transmitted during the user's assigned time slots.

Instead of or in addition to FDMA and TDMA techniques, wireless communications systems may employ "spread spectrum" or code division multiple access (CDMA) techniques. In a system employing spread spectrum techniques, a channel may be defined by modulating a data-modulated carrier signal by a unique spreading code, i.e., a code that spreads an original data-modulated carrier over a wide portion of the frequency spectrum in which the communications system operates. Data may be recovered from the transmitted signal by demodulating the signal using the same spreading code. Because the transmitted signal is spread across a wide bandwidth, spread spectrum communications can be less vulnerable to coherent noise sources which might "jam" other communications signals. The use of unique spreading codes for channels allows several users to effectively share the same bandwidth.

Conventional spread-spectrum communications systems commonly use so-called "direct sequence" spread spectrum modulation. In direct sequence modulation, a data-modulated carrier is directly modulated by a spreading code or sequence before being transmitted in a communications medium, e.g., an air interface. The spreading code typically includes a sequence of "chips" occurring at a chip rate that typically is much higher than the bit rate of the data being transmitted.

A direct sequence spread spectrum receiver typically includes a local sequence generator that locally produces a replica of a spreading sequence. This locally generated sequence is used to recover information from a transmitted spread spectrum signal that is modulated according to the same spreading sequence. Before information in a transmitted signal can be recovered, however, the locally generated spreading sequence typically must be synchronized with the spreading sequence that modulates the transmitted signal.

In conventional spread spectrum systems, synchronization is commonly achieved by transmitting a known pseudo-random noise (PN) sequence that a receiving unit can acquire and use to synchronize its de-spreading operations. A base station may broadcast, for example, a "pilot signal" comprising a fixed carrier modulated by a known PN sequence or a sequence of "pilot symbols" embedded at known locations in a transmitted data stream, with the transmitted pilot signal or pilot symbols being received by a mobile terminal and used to synchronize its de-spreading operations with the spreading operations of the base station.

As illustrated in FIG. 3, a radio communications signal 305 is received at an antenna 310 of a receiver 300 and processed in a radio frequency (RF) section 320 to produce baseband samples. Baseband samples corresponding to a received pilot signal are processed in a sequence acquisition and tracking circuit 340 to acquire and synchronize to the transmitted PN sequence. The synchronization information thereby obtained is used to synchronize spread spectrum demodulation in a spread spectrum demodulator 330.

Synchronization with a pilot signal or series of pilot symbols typically includes an initial acquisition phase during which a receiver searches for a known PN sequence in a received communications signal, followed by a tracking phase that achieves finer synchronization once the known PN sequence is detected. Commonly, acquisition is achieved by using a "sliding correlator" that computes a series of correlations between a sequence of samples of a received signal and the known PN sequence by "sliding" the sample sequence past all or a portion of the known PN sequence. The sliding correlator typically produces a correlation output that exhibits a pronounced peak value when correlation between the received signal sample sequence and the known PN sequence is high, i.e., when the sample sequence and known sequences are in phase.

It is generally desirable that this search process be performed as accurately and as quickly as possible. Although a sliding correlator that provides full-period correlation between the received signal samples and the known PN sequence may be desirable from the standpoint of accuracy, full period correlation may be impractical because the PN code used for the pilot signal of a spread spectrum system may be on the order of thousands of bits in length. A correlator designed to perform full period correlation on a code of such length would generally be slow, complex and power-inefficient.

For this reason, many practical sliding correlators correlate received signal samples with only a portion of the known PN sequence. Such partial-sequence correlation generally does not have well-known, structured correlation properties, and performance is generally dependent on the portion of the PN sequence that is used in the sliding correlator.

SUMMARY OF THE INVENTION

In light of the foregoing, it is an object of the present invention to provide receiver synchronizing methods and apparatus that can produce improved acquisition performance.

It is another object of the present invention to provide partial-sequence correlation methods and apparatus that can provide correlation outputs with improved discrimination between in-phase and out-of-phase conditions.

These and other objects, features and advantages are provided in a receiver by apparatus and methods in which a received signal, e.g., a pilot signal modulated according to a known-modulation sequence, is correlated with a subsequence of the modulation sequence that is selected based on a correlation between the subsequence and the modulation sequence. Preferably, the selected subsequence has an optimal, e.g., minimized, out-of-phase correlation with the modulation sequence in comparison to other subsequences of the modulation sequence. According to one aspect of the present invention, the selected subsequence is a subsequence that meets a "min-max" criterion, i.e., a subsequence having a minimum maximum out-of-phase component of the correlation with the modulation sequence. The maximum out-of-phase component may represent a single maximum out-of-phase correlation value or a sum of largest out-of-phase correlation values. According to another aspect of the present invention, the selected subsequence is a subsequence that meets a "max-power" criterion, i.e., a subsequence having a minimum aggregate out-of-phase correlation with the modulation sequence. According to other aspects, combined maximum and aggregate or minimized "nearest neighbor" criteria are used.

Use of a correlation subsequence that is selected based on a relative correlation property of the subsequence can improve the accuracy and reliability of partial sequence synchronization. For example, a subsequence meeting a "min-max" criterion may be used to reduce worst case false synchronization detection, while a subsequence meeting a "max-power" criterion may be used to reduce the average false alarm probability over all out-of-phase conditions.

In particular, according to the present invention a receiver in a communications system is operated by receiving a radio communications signal transmitted by a station of the communications system and generating a correlation output representing a correlation of the received radio communications signal and a subsequence of a modulation sequence that is selected based on a correlation between the selected subsequence and the modulation sequence. The receiver is then synchronized based on the generated correlation output. The selected subsequence preferably has an optimal out-of-phase correlation with the modulation sequence.

According to an aspect of the present invention, the selected subsequence has a minimum out of phase correlation with the modulation sequence in comparison to other subsequences of the modulation sequence. For example, the selected subsequence may have a "minimum maximum" out-of-phase correlation value, a "minimum aggregate" out-of-phase correlation metric, or a combination thereof associated therewith.

In one embodiment of the present invention, the communications system comprises a spread spectrum communications system that transmits a communications signal modulated according to a predetermined pseudo-noise (PN) sequence. The transmitted communications signal is received and a correlation output is generated representing a correlation of the received communications signal and a subsequence of the PN sequence selected is generated based on a correlation of the selected subsequence with the PN sequence. The receiver is synchronized based on the generated correlation output.

According to another aspect of the present invention, a modulation sequence encoded in a communications signal is detected by correlating the communications signal with a selected subsequence of the modulation sequence to generate a correlation output representing a measure of correlation between the communications signal and the modulation sequence, wherein the selected subsequence is selected based on a correlation between the selected subsequence and the modulation sequence. The selected subsequence preferably has an optimal out-of-phase correlation with the modulation sequence.

According to yet another aspect of the present invention, in a receiver for receiving a communications signal modulated according to a modulation sequence, an apparatus comprises a correlator operative to correlate the communications signal with a selected subsequence of the modulation sequence to generate a correlation output representing a measure of correlation between the communications signal and the modulation sequence, wherein the selected subsequence is selected based on a correlation between the selected subsequence and the modulation sequence. The selected subsequence preferably has an optimal out-of-phase correlation with the modulation sequence. The apparatus may further comprise means for receiving a communications signal modulated according to a predetermined pseudo-noise (PN) sequence, and the correlator may be coupled to the means for receiving and operative to generate a correlation output representing a correlation of the received communications signal and a selected subsequence of the PN sequence, wherein the selected subsequence is selected based on a correlation of the subsequence with the PN sequence. The apparatus may further comprise means for synchronizing the receiver based on the generated correlation output. Improved communications performance may thereby be provided.

DETAILED DESCRIPTION OF EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 4:
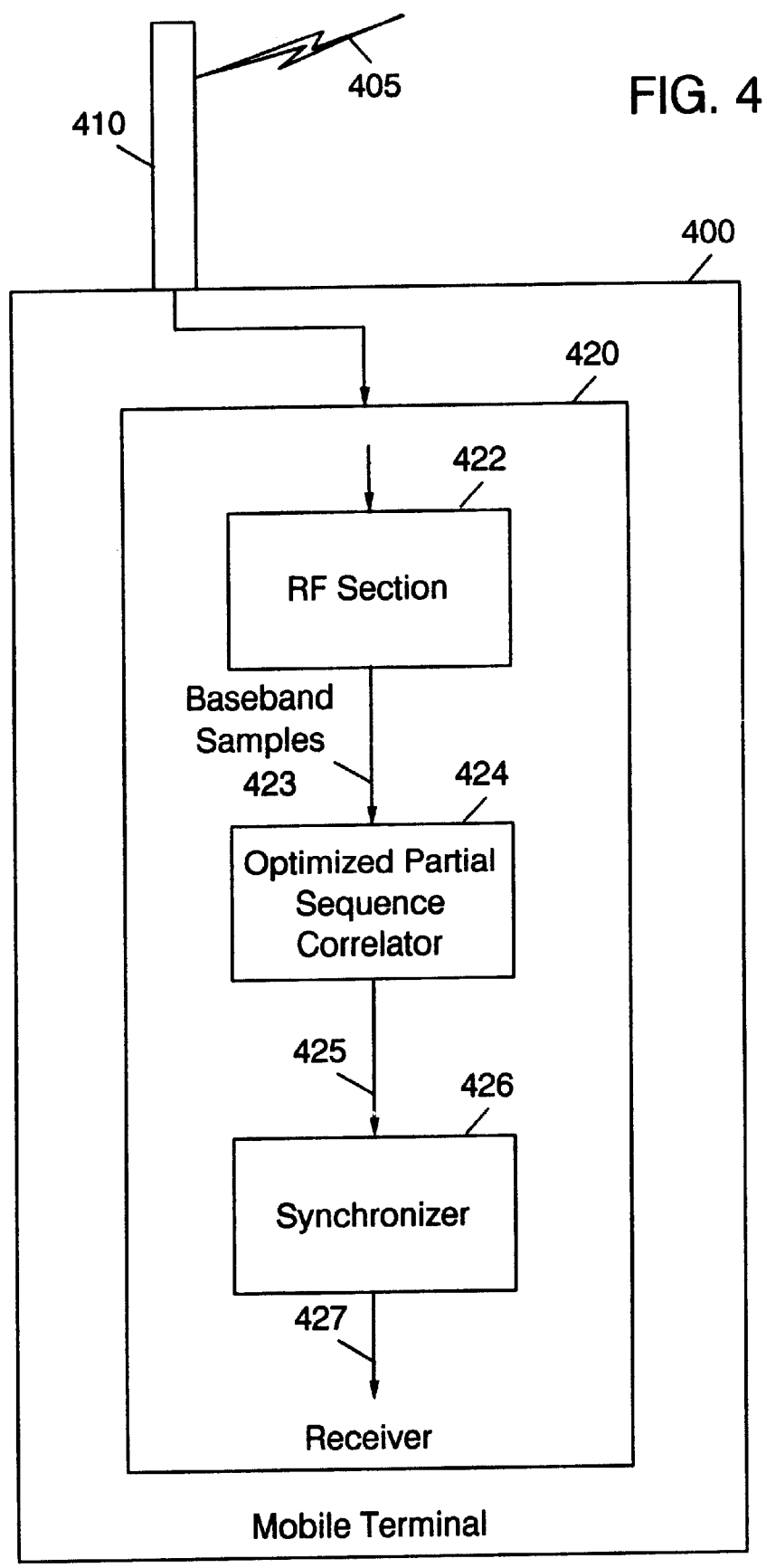
FIG. 4 is a schematic diagram illustrating a receiver according to an embodiment of the present invention.

FIG. 4 illustrates an exemplary mobile terminal 400 in which apparatus and methods of the present invention may be embodied. The mobile terminal 400 includes a receiver 420 that receives a radio communications signal 405 via an antenna 410. The received radio communications signal is processed in an RF section 422, producing baseband samples 423 which are passed to an optimized partial sequence correlator 424. The optimized partial sequence correlator 424 correlates the baseband samples 423 with a portion of a modulation sequence, producing a correlation output 425 that is used by a synchronizer 426 to produce synchronization information 427 for synchronizing operation of the receiver 420. The synchronizer 426 may take one of many forms including, for example, a simple threshold detector or a more complex structure that averages the correlation output 425 and detects the timing of the modulation sequence based on the averaged correlation output. Examples of different types of synchronizers may be found in the text *Spread Spectrum Communications* by Simon et al., published by Computer Science Press (1985), in the article "Direct Sequence Spread Spectrum Matched Filter Acquisition in Frequency-Selective Rayleigh Fading Channels," IEEE Journal on Selected Areas in Communications, Vol. 12, No. 5, June 1994, and in U.S. patent application Ser. No. 09/001,029 which is assigned to the assignee of the present application and incorporated herein by reference in its entirety.

Those skilled in the art will appreciate that RF section 422, the optimized partial sequence correlator 424, the synchronizer 426 and other elements of the receiver 420 of FIG. 4 may be implemented using a number of well-known communications components, such as mixers, amplifiers, application-specific integrated circuits (ASICs), digital signal processors (DSPs) and the like. Those skilled in the art will appreciate that the receiver 420 may, in general, be implemented using special-purpose hardware, software or firmware executing on special or general-purpose hardware, or combinations thereof.

Figure 5:
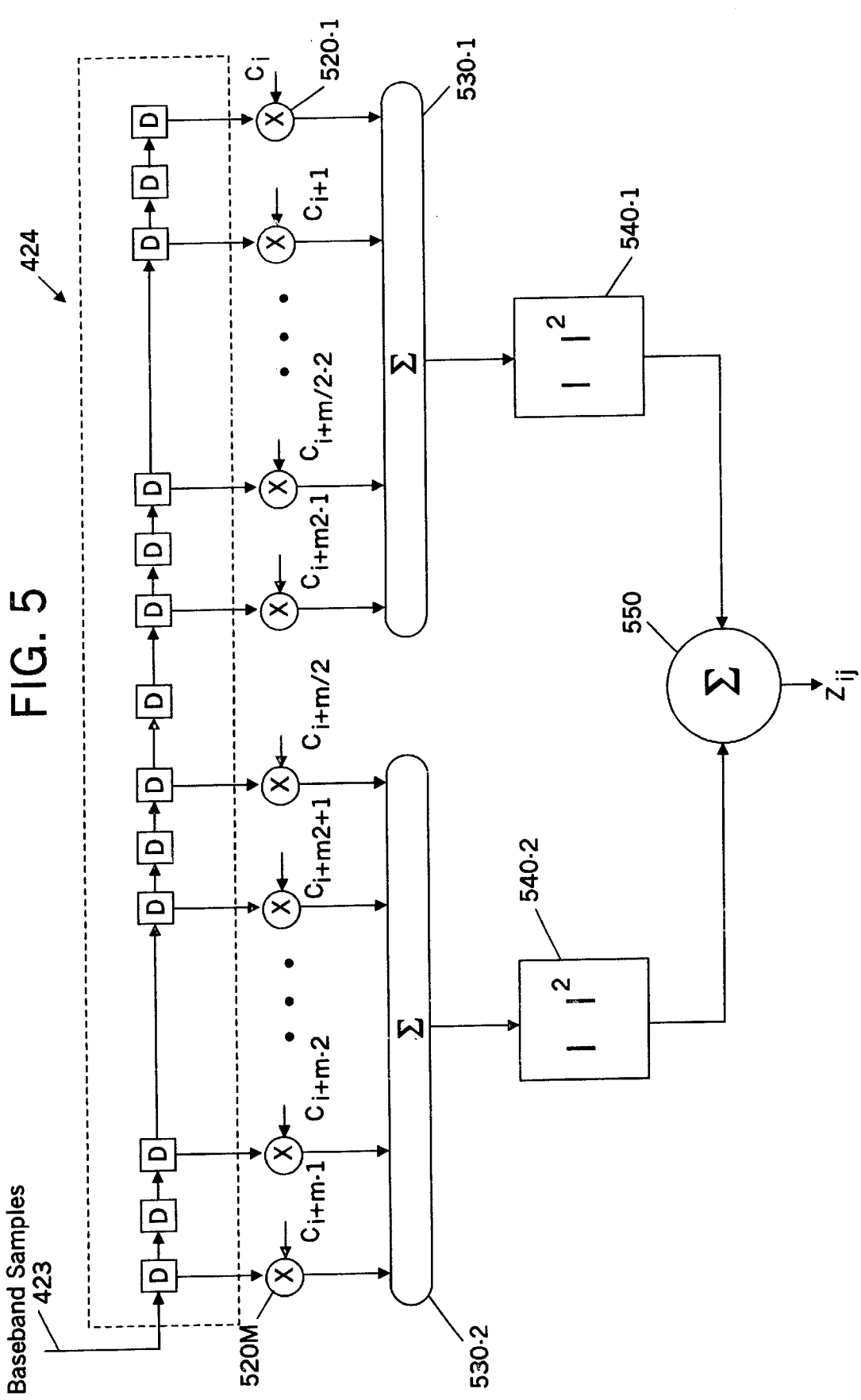
FIG. 5 is a schematic diagram illustrating a sliding correlator according to an embodiment of the present invention.
Figure 7A:
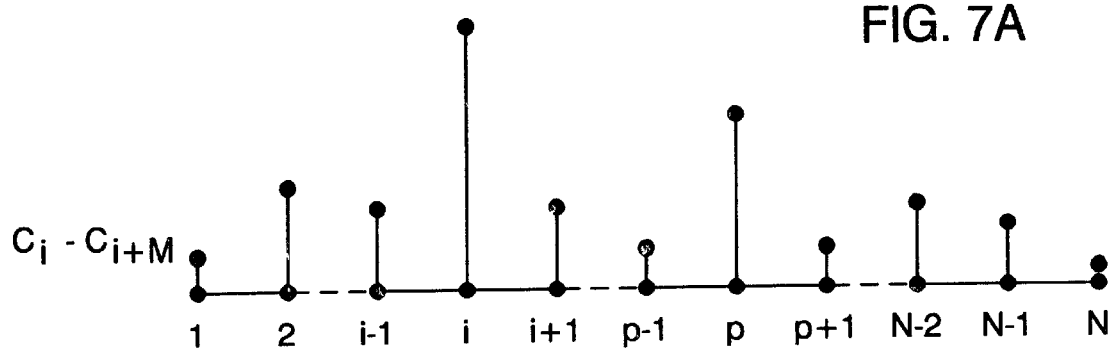
FIGS. 7A–7E are charts illustrating correlation values for subsequences of an exemplary modulation sequence.
Figure 7B:
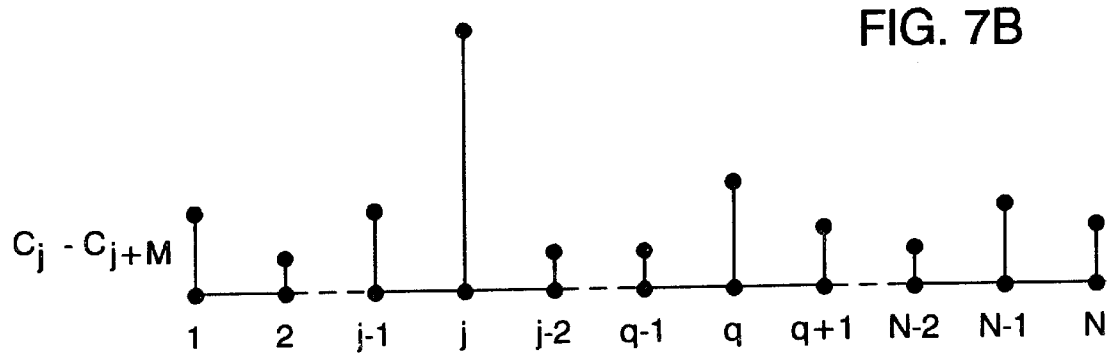
Figure 7C:
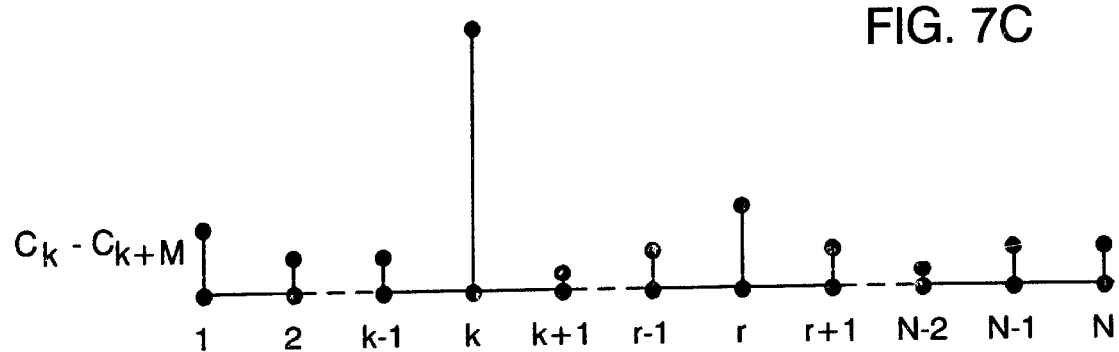
Figure 7D:
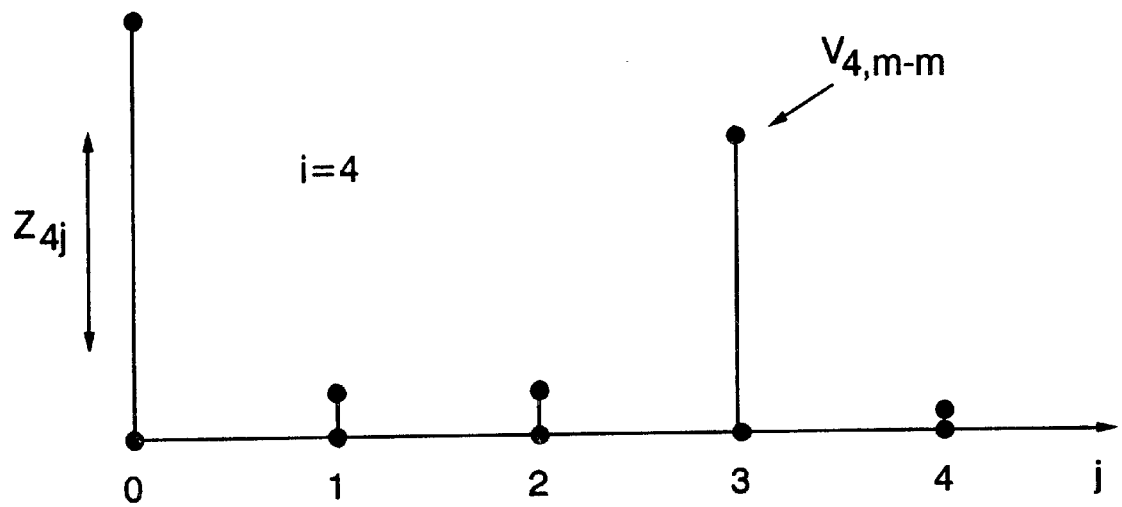
Figure 7E:
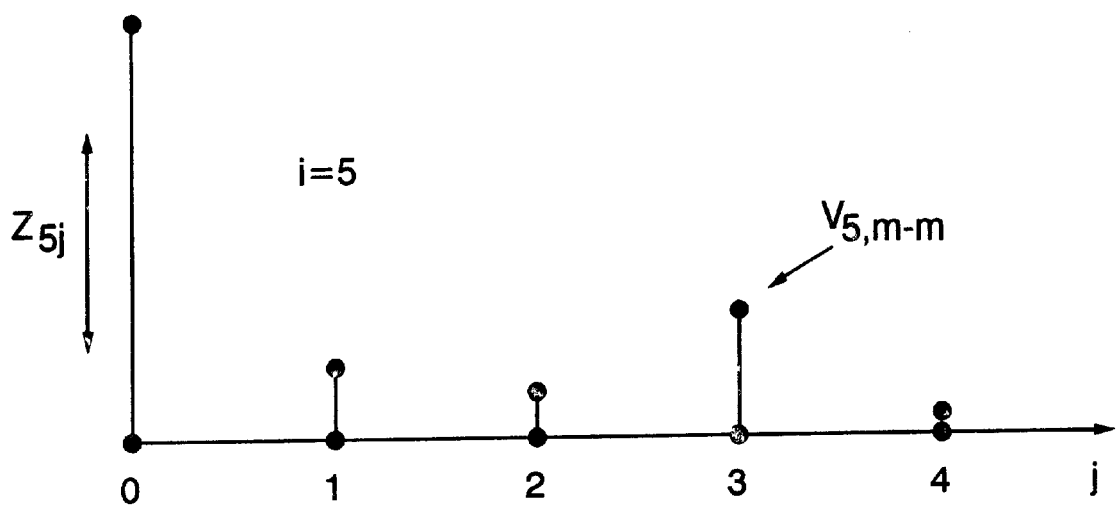

FIG. 5 illustrates an exemplary optimized partial sequence correlator 424. Baseband samples 423 are fed into a delay line 510 comprising a plurality of delay elements D. For the embodiment shown, the baseband samples 423 represent samples of a received signal sampled at a rate twice that of the chip rate of the known modulation sequence. However, those skilled in the art will appreciate that other sampling rates may be used with the present invention. The output of every other delay element D is multiplied by a respective chip of an M-chip subsequence $c_i$, $c_{i+1}, \ldots, c_{i+M+1}$ of a known N-chip modulation sequence $c_1, c_2, \ldots, c_N$ by a plurality of parallel multipliers 520-1–520-M. As illustrated, respective groups of outputs of the multipliers 520-1–520-N are fed into respective summing blocks 530-1, 530-2. The magnitudes of the outputs of the summing blocks 530-1, 530-2 are squared in magnitude-squared blocks 540-1, 540-2, and summed in another summing block 550 to produce a correlation output $Z_{ij}$, e.g., a series of correlation values, as will be discussed in detail below.

Those skilled in the art will appreciate that correlator structures other than that illustrated in FIG. 5 may be used with the present invention. For example, although the structure of FIG. 5 assumes antipodal (±1) code and sample values, and thus employs magnitude-squared blocks 540-1, 540-2, those skilled in the art will appreciate that unipodal (0,1) may be used. Other sliding correlator structures that that may be used with the present invention are described in U.S. patent application Ser. No. 09/001,029, assigned to the assignee of the present invention and incorporated by reference in its entirety herein. One or more integrate-and-dump correlator may be used with the present invention as well. In addition, although the illustrated embodiment has a segmented summing structure that is particularly advantageous in reducing errors arising from mismatches between the frequencies of the received and locally-generated sequences, other summing structures may be used.

Referring to FIG. 5, given a particular choice of i, there are N correlation values $Z_{ij}$ between the full PN modulation sequence $c_1, c_2, \ldots, c_N$ and a subsequence $c_i, c_{i+1}, \ldots c_{i+M-1}$, where j represents a relative delay between the subsequence and the full sequence. The correlation value $Z_{ij}$ when j=0 corresponds to a matching or "in phase" condition, i.e., a condition in which the first chip $c_i$ of the subsequence $c_i, c_{i+1}, \ldots, c_{i+M-1}$ is aligned with the ith chip of the full PN modulation sequence $c_1, c_2, \ldots, c_N$. When j≧1, the correlation output $Z_{ij}$ corresponds to an out-of-phase condition:

$$Z_{ij} = \sum_{s=1}^{L} \left| \sum_{k=\frac{M(s-1)}{L}+i}^{\frac{Ms}{L}+i-1} c_k^* c_{k+j} \right|^2.$$

According to one aspect of the present invention, a subsequence of a modulation sequence is selected based upon a "min-max" out-of-phase criterion. For each possible subsequence $c_i, c_{i+1}, \ldots, c_{i+M}$ of a modulation sequence $c_1, c_2, \ldots, c_N$, there are N correlation values. Letting $V_{i,m-m}$ denote a respective maximum out-of-phase correlation output for a respective subsequence $c_i, c_{i+1}, c_{i+M-1}$:

$$V_{i,m-m} = \max_{1 \le j \le N-1} \{Z_{ij}\},$$

the subsequence having the minimum $V_{i,m-m}$ is selected for use in the partial sequence correlator. This choice is believed to minimize worst case false synchronization detection. Those skilled in the art will appreciate that the min-max metric $V_{i,m-m}$ may be generalized. For example, instead of examining a single maximum out-of-phase correlation value, a weighted combination of a group of largest values could be used for the min-max metric $V_{i,m-m}$.

According to another aspect of the present invention, this aggregate measure of correlation is generalized to a "min-power" criterion. Letting $V_{i,m-p}$ denote a respective sum of out-of-phase correlation outputs for a respective subsequence $c_i, c_{i+1}, \ldots, c_{i+M-1}$:

$$V_{i,m-p} = \sum_{j=1}^{N-1} Z_{ij},$$

the subsequence having the minimum $V_{i,m-p}$ is selected for use in the partial sequence correlator. This choice minimizes the total out-of-phase power in the correlation output, and thus is believed to minimize the average false alarm probability over all out-of-phase conditions.

It is believed that, in most direct sequence spread spectrum acquisition systems, the min-max criteria will yield faster acquisition. However, in systems which use a very long acquisition subsequence, and in which most of the out-of-phase power is concentrated around one delay value j, acquisition time using a simple threshold detector (in, for example, the synchronizer 426 of FIG. 4) may be shorter using the min-power technique.

Figure 1:
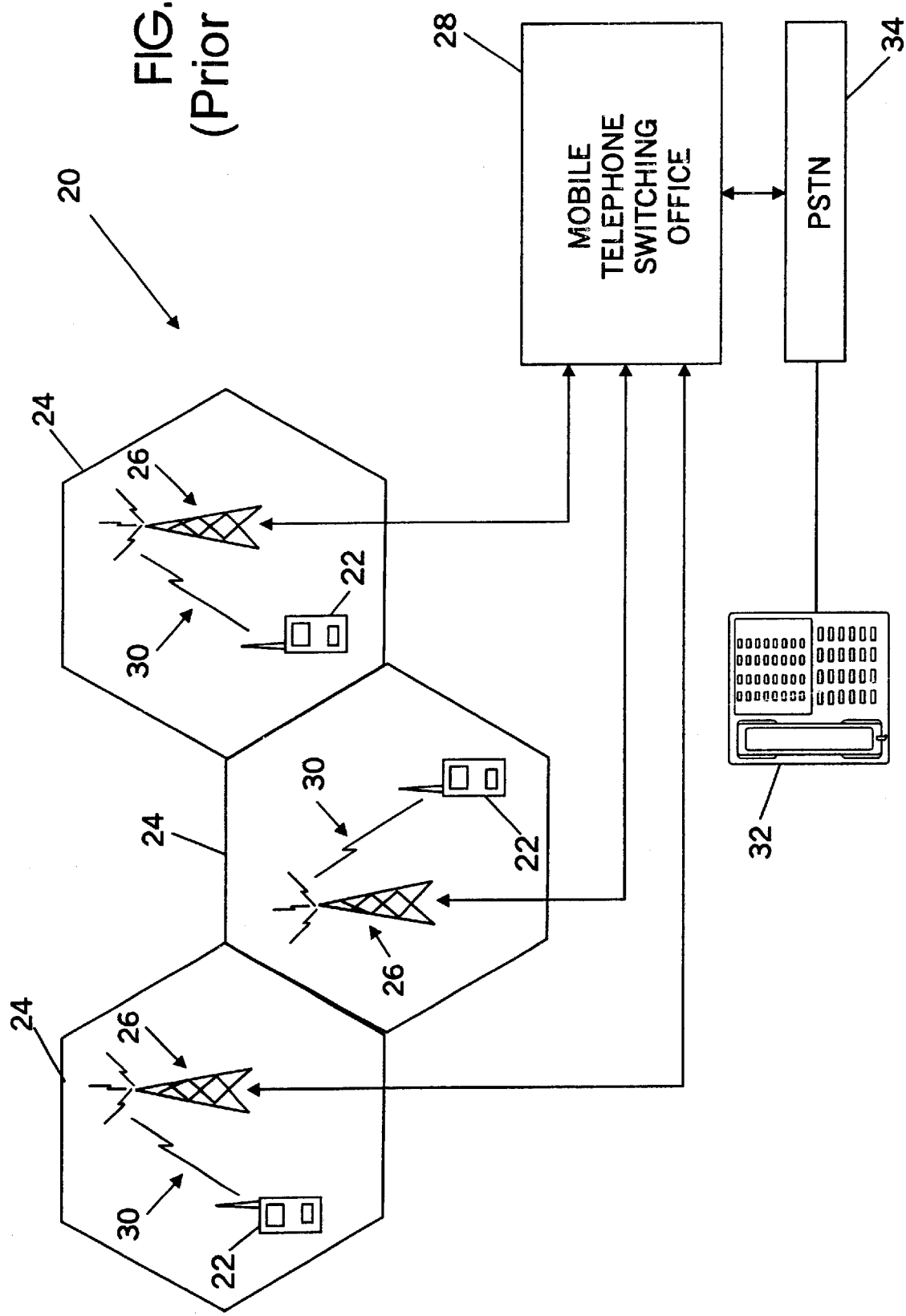
FIG. 1 is a schematic diagram illustrating a conventional terrestrial cellular wireless communications system.
Figure 2:
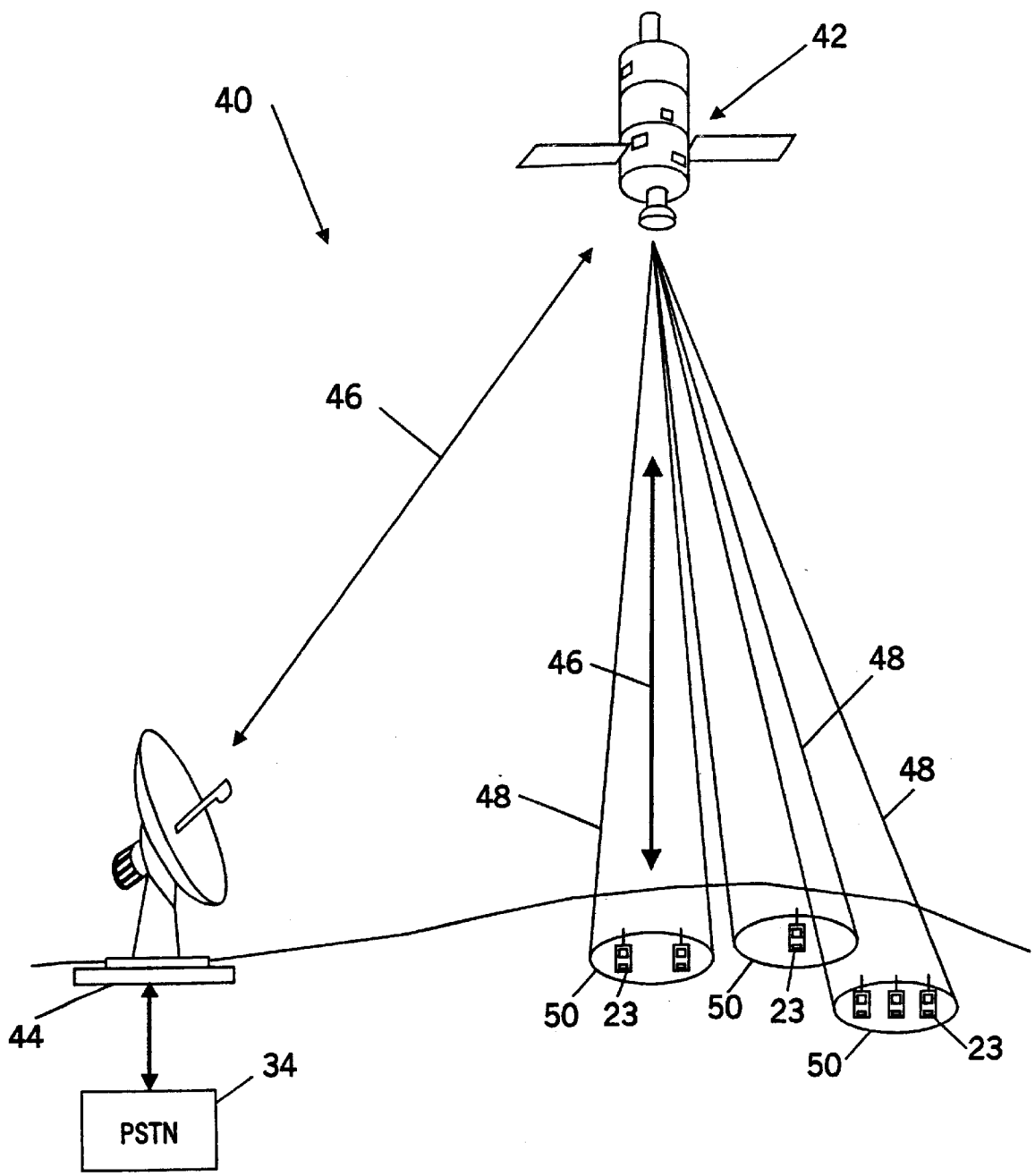
FIG. 2 is a schematic diagram illustrating a conventional satellite-based cellular wireless communications system.
Figure 3:
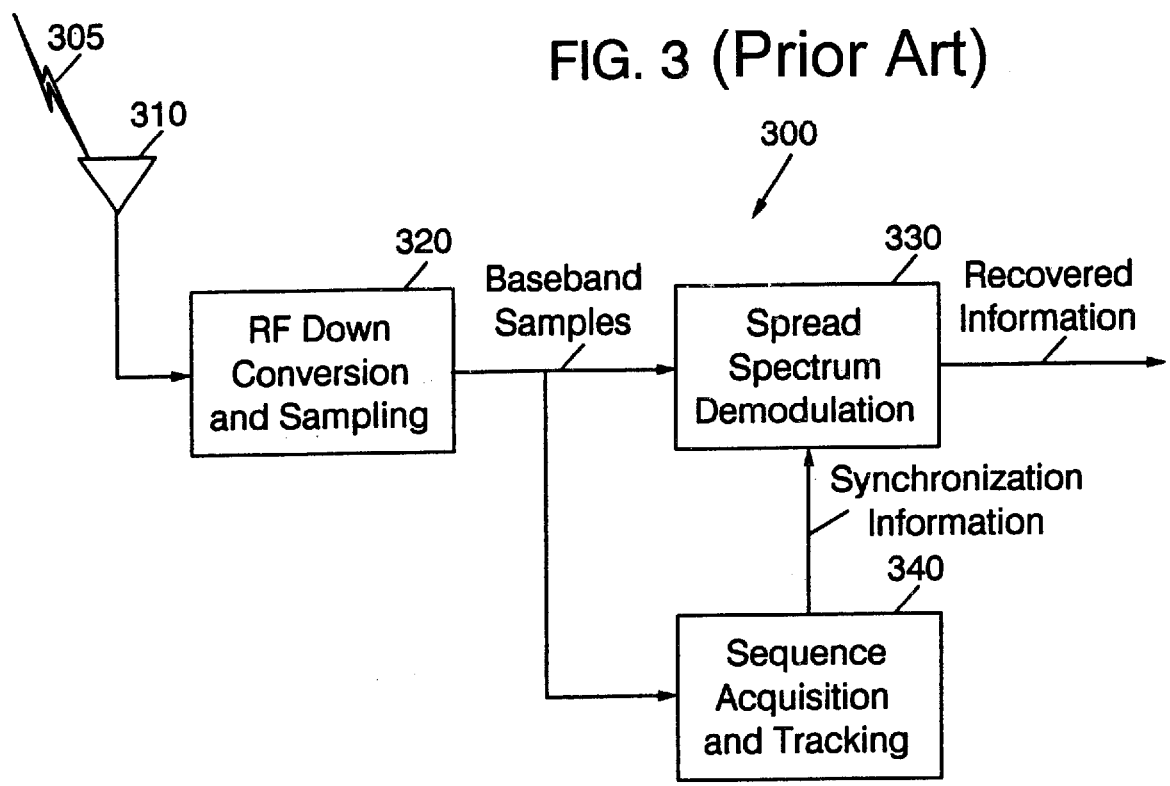
FIG. 3 is a schematic diagram illustrating a conventional spread spectrum receiver.
Figure 6:
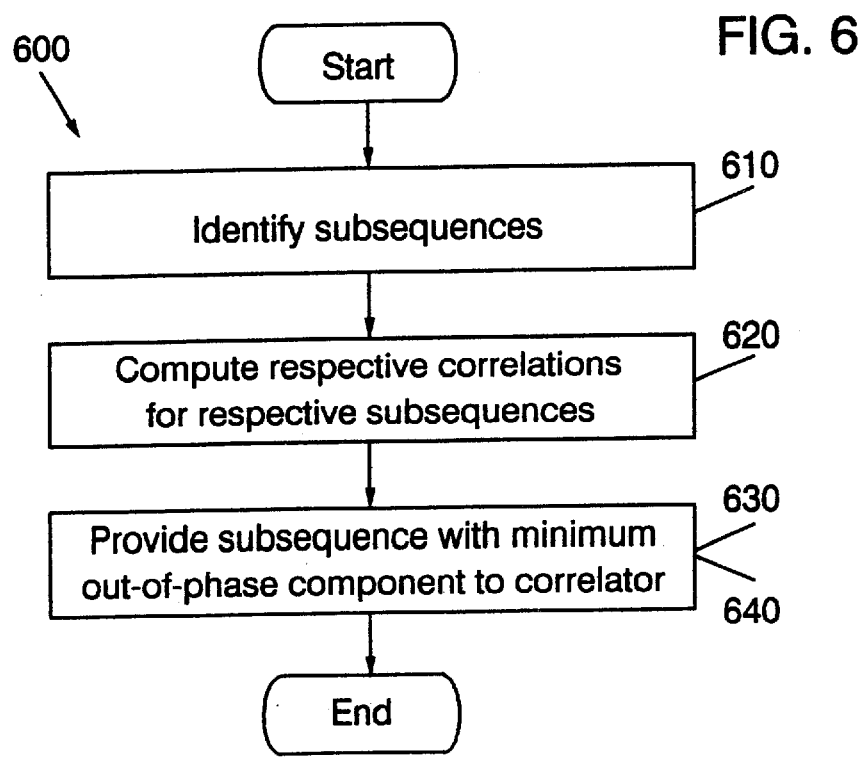
FIG. 6 is a flowchart illustrating exemplary operations for selecting an optimal subsequence of a modulation sequence according to an aspect of the present invention.

FIG. 6 is a flowchart illustration of operations 600 for selecting a subsequence of a modulation sequence according to an aspect of the present invention. Subsequences of the modulation sequence are identified (Block 610). Respective out-of-phase correlations are computed for respective ones of the identified subsequences (Block 620). A subsequence having a minimum out-of-phase correlation component is selected for use in the partial sequence correlator (Block 630).

Those skilled in the art will appreciate that the operations of FIG. 6 may be implemented during design of a receiver, as the pilot signal generated by a spread-spectrum system, such as an IS-95 CDMA system, is typically fixed by standards and thus not subject to change. Those skilled in the art will appreciate, however, that in systems in which a transmitted PN sequence is subject to change, the operations of FIG. 6 may be performed adaptively. For example, a receiver could receive a message identifying a new PN sequence to which the system is changing, or a list of candidate sequences to which the system may change, and compute an optimal partial correlation sequence therefrom. Alternatively, an optimal subsequence for a new modulation sequence could be transmitted to a receiver prior to transmitting the new modulation sequence.

It will be understood that blocks of the flowchart illustration of FIG. 6, and combinations of blocks in the flowchart illustration, can be implemented by computer program instructions which may be loaded onto a computer or other programmable data processing apparatus to produce a machine such that the instructions which execute on the computer or other programmable data processing apparatus create means for implementing the functions specified in the flowchart block or blocks. For example, blocks of the flowchart illustration may be implemented as computer instructions that are loaded and executed by a microprocessor, digital signal processor (DSP) or other computing device used to implement the partial sequence correlator 424 of the receiver 420 of FIG. 4. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustration of FIG. 6 support combinations of means for performing the specified functions and combinations of steps for performing the specified functions. It will also be understood that each block of the flowchart illustration of FIG. 6, and combinations of blocks therein, can be implemented by special purpose hardware-based computer systems which perform the specified functions or steps, or combinations of special purpose hardware and computer instructions.

Table I and FIGS. 7A–7E illustrate correlation values $Z_{ij}$ for subsequences of an exemplary modulation sequence starting, respectively, at positions i=1, 2, 3, 4 and 5. As can be seen, according to a min-max criterion, the subsequence starting at i=3 would be chosen, while under a min-power criterion, the subsequence starting at i=4 would be selected.

TABLE I

| $Z_{ij}$ | j = 1 | j = 2 | j = 3 | j = 4 | $V_{i,m-m}$ | $V_{i,m-p}$ |
|---|---|---|---|---|---|---|
| i = 1 | 1.5 | 1.5 | 2.5 | 2.0 | 2.5 | 7.5 |
| i = 2 | 0.75 | 3.0 | 1.5 | 2.25 | 3.0 | 7.5 |
| i = 3 | 0.75 | 1.5 | 1.5 | 2.0 | 2.0 | 5.75 |
| i = 4 | 0.5 | 0.5 | 4.0 | 0.25 | 4.0 | 5.25 |
| i = 5 | 3.0 | 1.5 | 3.75 | 0.75 | 3.75 | 9.0 |

Those skilled in the art will appreciate that metrics other than the above-described $V_{i,m-m}$ and $V_{i,m-p}$ and criteria other than the above-described min-max and min-power criteria, may be used with the present invention. In general, it will be understood that any one of a number of choices of metrics and selection criteria which result in selecting a subsequence that optimizes some measure of correlation for a subsequence of a modulation sequence may be used with the present invention. These may include, for example, criteria based on a weighted combination of the min-max and min-power metrics $V_{i,m-m}$, $V_{i,m-p}$ criteria described above, as well as criteria based on an average out-of-phase correlation of subsequences of a modulation sequence with the modulation sequence.

Using an analogy from coding theory, minimization of a measure of the "nearest neighbors" to an in-phase correlation value may be used as a criterion for selection of an optimal subsequence. For a subsequence of a PN modulation sequence, the nearest neighbors are those out-of-phase positions j that satisfy the relation $$\frac{Z_{ij}}{Z_{ii}} > \alpha,$$

where $\alpha$ represents a threshold value, and $Z_{ii}$ represents the in-phase correlation value for a sequence $c_i, c_{i+1}, \ldots, c_{i+M-1}$. Thus, a criterion such as $$\min_i \left[ \frac{1}{N_j} \sum_{j \in J} \backslash(\backslash\%\backslash) Z_{ij} \right]$$

may be used to select a subsequence, where J is the set of correlations which exceed a predetermined threshold $\alpha$, and $N_j$ normalizes the number of elements in the set J.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of operating a receiver in a communications system, the method comprising the steps of:
    selecting a subsequence of a modulation sequence based on a correlation between the subsequence and the modulation sequence;
    receiving a radio communications signal transmitted by a station of the communications system;
    generating a correlation output representing a correlation of the received radio communications signal and the selected subsequence of a modulation sequence; and
    synchronizing the receiver based on the generated correlation output.

2. A method according to claim 1, wherein the selected subsequence has an optimal out-of-phase correlation with the modulation sequence.

3. A method according to claim 1, wherein the selected subsequence has a minimum out of phase correlation with the modulation sequence in comparison to other subsequences of the modulation sequence.

4. A method according to claim 3, wherein the selected subsequence has a minimum maximum out-of-phase correlation value associated therewith.

5. A method according to claim 3, wherein the selected subsequence has a minimum aggregate out-of-phase correlation metric associated therewith.

6. A method according to claim 3, wherein the selected subsequence has a minimum combination of a maximum out of phase correlation value and an aggregate out of phase correlation metric associated therewith.

7. A method according to claim 3, wherein the selected subsequence has a minimum out-of-phase correlation with the modulation sequence in comparison to subsequences of the modulation sequence having equal length.

8. A method according to claim 1, wherein the selected subsequence is selected based on a metric derived from a selected set of out-of-phase correlation values.

9. A method according to claim 8, wherein the selected subsequence is selected based on a metric derived from a selected set of out-of-phase correlation values nearest to an in-phase correlation value.

10. A method according to claim 1, wherein the communications system comprises a spread spectrum communications system which transmits a communications signal modulated according to a predetermined pseudo-noise (PN) sequence, and:
    wherein said step of receiving comprises the step of receiving the transmitted communications signal;
    wherein said step of generating a correlation output comprises the step of generating a correlation output representing a correlation of the received communications signal and a subsequence of the PN sequence selected based on a correlation of the selected subsequence with the PN sequence; and
    wherein said step of synchronizing comprises the step of synchronizing the receiver based on the generated correlation output.

11. A method according to claim 10, wherein said step of synchronizing comprises the step of generating synchronization information from the correlation output, and wherein said step of synchronizing is followed by the steps of:
    receiving a communications signal modulated according to a spreading code; and
    demodulating the received communications signal according to the spreading code and the generated synchronization information.

12. A method of detecting a modulation sequence encoded in a communications signal, the method comprising the step of:
   correlating the communications signal with a selected subsequence of the modulation sequence to generate a correlation output representing a measure of correlation between the communications signal and the modulation sequence, wherein the selected subsequence is selected based on a correlation between the selected subsequence and the modulation sequence.

13. A method according to claim 12, wherein the selected subsequence has an optimal out-of-phase correlation with the modulation sequence.

14. A method according to claim 13, wherein the selected subsequence has a minimum out of phase correlation with the modulation sequence in comparison to other subsequences of the modulation sequence.

15. A method according to claim 14, wherein the selected subsequence has a minimum maximum out-of-phase correlation value associated therewith.

16. A method according to claim 14, wherein the selected subsequence has a minimum aggregate out-of-phase correlation metric associated therewith.

17. A method according to claim 14, wherein the selected subsequence has a minimum metric representing a combination of a maximum out of phase correlation value and an aggregate out of phase correlation metric.

18. A method according to claim 14, wherein the selected subsequence has a minimum out-of-phase correlation with the modulation sequence in comparison to subsequences of the modulation sequence having equal length.

19. A method according to claim 12, wherein the selected subsequence is selected based on a metric derived from a selected set of out-of-phase correlation values.

20. A method according to claim 19, wherein the selected subsequence is selected based on a metric derived from a selected set of out-of-phase correlation values nearest to an in-phase correlation value.

21. A method according to claim 12:
   wherein said step of correlating is preceded by the steps of:
      providing the modulation sequence;
      identifying a plurality of subsequences of the modulation sequence;
      determining respective correlations of the identified subsequences with the modulation sequence; and
      selecting a subsequence of the plurality of subsequences based on the determined correlations; and
   wherein said step of correlating comprises the step of correlating the communications signal with the selected subsequence.

22. A method according to claim 21:
   wherein said step of determining comprises the step of determining respective out-of-phase correlations of the modulation sequence with the identified subsequences; and
   wherein said step of selecting a subsequence comprises the step of selecting a subsequence having a minimum out-of-phase correlation with the modulation sequence.

23. A method according to claim 22, wherein said step of selecting comprises the step of selecting a subsequence having a minimum maximum out-of-phase correlation value.

24. A method according to claim 22, wherein said step of selecting comprises the step of selecting a subsequence having a minimum aggregate correlation metric.

25. A method according to claim 22, wherein said step of selecting comprises the step of selecting subsequence having a minimum metric representing a combination of a maximum out of phase correlation value and an aggregate out of phase correlation metric.

26. In a receiver for receiving a communications signal modulated according to a modulation sequence, an apparatus comprising;
   a correlator operative to correlate the communications signal with a selected subsequence of the modulation sequence to generate a correlation output representing a measure of correlation between the communications signal and the modulation sequence, wherein the selected subsequence is selected based on a correlation between the selected subsequence and the modulation sequence.

27. An apparatus according to claim 26, wherein the selected subsequence has an optimal out-of-phase correlation with the modulation sequence.

28. An apparatus according to claim 27, wherein the selected subsequence has a minimum out of phase correlation with the modulation sequence in comparison to other subsequences of the modulation sequence.

29. An apparatus according to claim 28, wherein the selected subsequence has a minimum maximum out-of-phase correlation value associated therewith.

30. An apparatus according to claim 28, wherein the selected subsequence has a minimum aggregate out-of-phase correlation metric associated therewith.

31. An apparatus according to claim 28, wherein the selected subsequence has a minimum metric representing a combination of a maximum out of phase correlation value and an aggregate out of phase correlation metric.

32. An apparatus according to claim 26, wherein the selected subsequence is selected based on a metric derived from a selected set of out-of-phase correlation values.

33. An apparatus according to claim 32, wherein the selected subsequence is selected based on a metric derived from a selected set of out-of-phase correlation values nearest to an in-phase correlation value.

34. An apparatus according to claim 26, wherein the selected subsequence has a minimum out-of-phase correlation with the modulation sequence in comparison to other subsequences of the modulation sequence having equal length.

35. An apparatus according to claim 26, further comprising means for receiving a communications signal modulated according to a predetermined pseudo-noise (PN) sequence, and wherein said correlator is coupled to said means for receiving and is operative to generate a correlation output representing a correlation of the received communications signal and a selected subsequence of the PN sequence, wherein the selected subsequence is selected based on a correlation of the subsequence with the PN sequence.

36. An apparatus according to claim 35, further comprising means for synchronizing the receiver based on the generated correlation output.

37. An apparatus according to claim 36, wherein said means for synchronizing comprises means for generating synchronization information from the correlation output, and further comprising:
   means for receiving a communications signal modulated according to a spreading code; and
   means, responsive to said means for generating synchronization information, for demodulating the received communications signal according to the spreading code and the generated synchronization information.

38. A method of configuring a communications receiver that is operative to communicate with a wireless communications system according to a modulation sequence, the receiver including a partial sequence correlator operative to correlate a received signal with a subsequence of the modulation sequence and a synchronizer operative to synchronize the receiver with the wireless communications system responsive to the correlation of the received signal and the subsequence of the modulation sequence, the method comprising:

selecting a subsequence of a modulation sequence from a set of possible subsequences of the modulation sequence based on correlations between the set of subsequences and the modulation sequence; and providing the selected subsequence to the partial sequence correlator of the receiver.

39. A method according to claim 38, wherein the selected subsequence has an optimal out-of-phase correlation with the modulation sequence.

40. A method according to claim 38, wherein the selected subsequence has a minimum out of phase correlation with the modulation sequence in comparison to other subsequences of the modulation sequence.

41. A method according to claim 40, wherein the selected subsequence has a minimum maximum out-of-phase correlation value associated therewith.

42. A method according to claim 40, wherein the selected subsequence has a minimum aggregate out-of-phase correlation metric associated therewith.

43. A method according to claim 40, wherein the selected subsequence has a minimum combination of a maximum out of phase correlation value and an aggregate out of phase correlation metric associated therewith.

44. A method according to claim 40, wherein the selected subsequence has a minimum out-of-phase correlation with the modulation sequence in comparison to subsequences of the modulation sequence having equal length.

45. A method according to claim 38, wherein the selected subsequence is selected based on a metric derived from a selected set of out-of-phase correlation values.

46. A method according to claim 45, wherein the selected subsequence is selected based on a metric derived from a selected set of out-of-phase correlation values nearest to an in-phase correlation value.

* * * * *

UNITED STATES PATENT AND TRADEMARK OFFICE
CERTIFICATE OF CORRECTION

PATENT NO.     : 6,421,371 B1
DATED          : July 16, 2002
INVENTOR(S)    : Essam Sourour et al.

It is certified that error appears in the above-identified patent and that said Letters Patent is hereby corrected as shown below:

Column 9,
Line 55, please change the equation to read:

$$\min_i \left[ \frac{1}{N_I} \sum_{j \in J} Z_{ij} \right]$$

Signed and Sealed this

Seventeenth Day of August, 2004

JON W. DUDAS
*Acting Director of the United States Patent and Trademark Office*